US 6,692,388 B2

(12) United States Patent
Nirasawa et al.

(10) Patent No.: US 6,692,388 B2
(45) Date of Patent: Feb. 17, 2004

(54) HYDRAULIC CONTROLLER

(75) Inventors: Hideo Nirasawa, Wako (JP); Katsuyuki Narai, Wako (JP); Akihiro Yamaguchi, Wako (JP); Junji Urano, Wako (JP); Hisashi Kunii, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 69 days.

(21) Appl. No.: 10/147,178

(22) Filed: May 15, 2002

(65) Prior Publication Data

US 2002/0189252 A1 Dec. 19, 2002

(30) Foreign Application Priority Data

| May 15, 2001 | (JP) | ............ | 2001-144366 |
| May 15, 2001 | (JP) | ............ | 2001-144368 |

(51) Int. Cl.[7] .............................................. F16H 59/00
(52) U.S. Cl. ....................................................... 474/28
(58) Field of Search ................................ 474/28, 18, 22

(56) References Cited

U.S. PATENT DOCUMENTS

| 3,596,528 | A | * | 8/1971 | Dittrich et al. ................ 474/12 |
| 4,923,433 | A | * | 5/1990 | Tanaka et al. ................ 474/11 |
| 6,090,000 | A | * | 7/2000 | Senger ......................... 474/18 |
| 6,110,062 | A | * | 8/2000 | Fujikawa ...................... 474/28 |
| 6,468,171 | B1 | * | 10/2002 | Panther ........................ 474/28 |
| 6,561,934 | B2 | * | 5/2003 | Kashiwase ................... 474/28 |

FOREIGN PATENT DOCUMENTS

| JP | 63-30662 | | 2/1988 |
| JP | 04254057 | A | 9/1992 |
| JP | 06026565 | A | 2/1994 |
| JP | 7-20437 | | 4/1995 |
| JP | 11257445 | A | 9/1999 |

* cited by examiner

*Primary Examiner*—Thomas R. Hannon
(74) *Attorney, Agent, or Firm*—Lahive & Cockfield, LLP

(57) ABSTRACT

A hydraulic controller comprises a structure composed of a separator plate 70 sandwiched between first and second valve bodies 60*a* and 80*a*, in which structure, an oil passage 103 connecting a SC shift valve 92 provided upstream and a SC backup valve 94 provided downstream is provided with a choke 75. When the separator plate 70, in which a choke opening 75*a* is formed, is sandwiched between the first and second valve bodies, the upstream part of the oil passage 103 is in fluid communication with one end of the choke opening 75*a* while the downstream part of the oil passage 103 is in fluid communication with the other end of the choke opening 75*a*. In this arrangement, a long narrow room formed by the choke opening 75*a* sandwiched between the first and second valve bodies comprises the choke 75.

13 Claims, 14 Drawing Sheets

Fig. 13
(A)
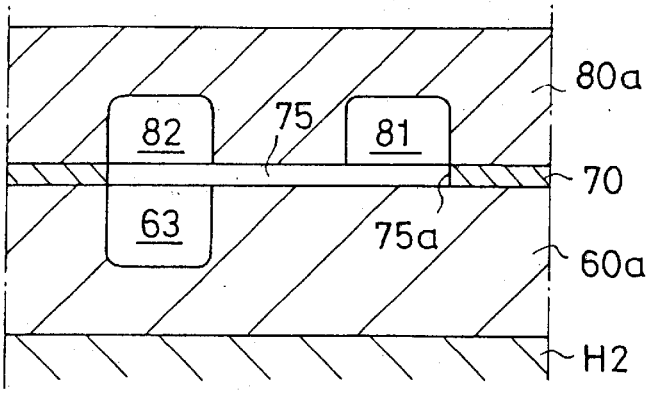
(B)
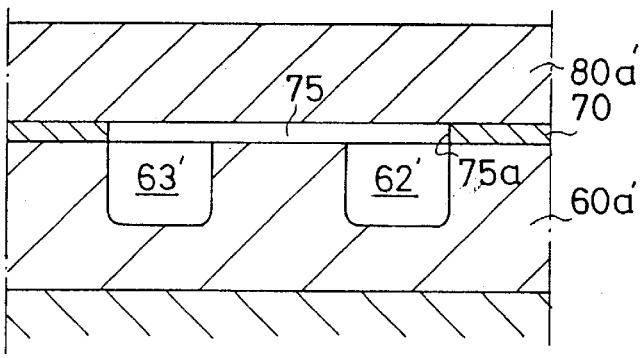
(C)
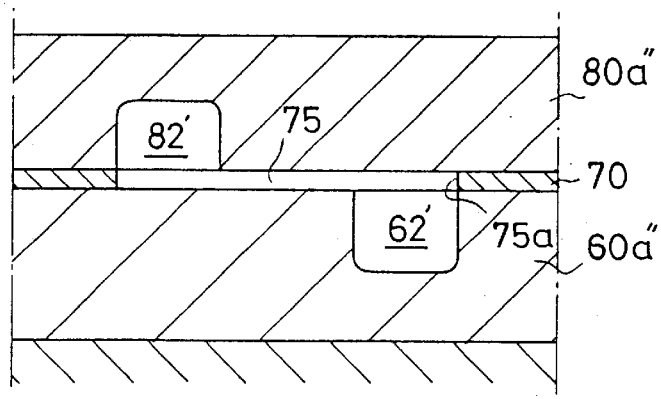

HYDRAULIC CONTROLLER

FIELD OF THE INVENTION

The present invention relates to a hydraulic controller which comprises a choking element for an internal oil passage (especially, a choking element that is generally referred to as "choke passage").

Furthermore, the present invention relates to a hydraulic controller which generates a signal pressure by using an above mentioned choking element so as to control the operation of a transmission. The present invention relates particularly to a hydraulic controller which provides a signal pressure that corresponds to the rotation of the engine and is used, for example, for operating the starting clutch of the transmission.

BACKGROUND OF THE INVENTION

For hydraulically executing the shift control of a transmission, various types of hydraulic controller have been known, and hydraulic controllers have been incorporated in transmissions for hydraulic shift control. Such a hydraulic controller includes a regulator valve, which is used to adjust and produce a line pressure from oil supplied by an oil pump. This line pressure is then used for producing various control pressures to execute, for example, the shift control of the transmission. The part of the oil that is supplied from the pump to the regulator valve but not used for the line pressure to execute various control operations is discharged from the regulator valve. This discharged oil is used for lubricating the internal mechanisms of the transmission. For performing the lubrication, the hydraulic controller includes various lubrication control valves to control appropriately the pressure necessary for distributing a predetermined amount of lubrication oil to each internal mechanism.

In many cases, such a hydraulic controller includes many choking elements (various orifices and chokes), which are provided to oil passages in the transmission. For example, Japanese Laid-Open Patent Publication No. H04(1992)-254057 discloses a hydraulic controller which has hydraulic control valves and a separator plate between them on a side of the housing of the transmission. In this hydraulic controller, the separator plate is provided with a plurality of small apertures, i.e., choking elements (orifices).

Choking elements can be provided in this way, i.e., as orifices formed in the separator plate, but the choking elements provided in this way cannot be highly viscosity-sensitive choking elements, i.e., choking elements whose passage lengths are longer than their diameters, disclosed, for example, in Japanese Utility-Model Publication No. H07(1995)-20437. By the way, a control valve can be provided with a choking element formed in the valve body thereof. However, choking elements are small apertures, so it is difficult to form choking elements in a casting process. They must be formed by machining, for example, by drilling. As choking elements are difficult to form, the machining cost is relatively high.

Furthermore, if apertures formed in the separator plate are to be used as orifices, then the apertures must be connected to oil passages provided on one side of the separator plate and to other oil passages provided on the other side thereof, so that oil can flow continuously. Because of this reason, if orifices are to be provided in passages formed in the valve body that is provided on one side of the separator plate, then it is relatively difficult to use small apertures formed in the separator plate as orifices.

Moreover, generally, a vehicular transmission comprises a starting clutch, which is provided between the input member and the output member of the transmission, the input member being driven by a prime mover (engine) and the output member being connected to wheels of a vehicle. In this arrangement, the starting clutch typically being actuated hydraulically controls the engagement of the input and output members, for example, in starting or stopping the vehicle. Such an engagement control is executed generally in correspondence to the rotational speed of the prime mover. In such a case, the rotational speed of the prime mover is detected by a sensor, which generates a signal representing the rotational speed. This signal is used to control the operation of an electrically controlled valve, which produces a control pressure used for the engagement control.

In such a hydraulic control that utilizes an electrically controlled valve, a control failure can occur if electrical trouble (for example, a problem that the control system cannot start up) or an open stick (a condition where a valve spool sticks and stays open) happens. To avoid a control failure, the controller is often equipped with a backup system that utilizes a valve to generate a signal pressure in correspondence to the rotational speed of the prime mover, and then this signal pressure is used for the engagement control in backup operations. For example, a Pitot-tube is used to generate the signal pressure for the execution of the engagement control (refer to Japanese Laid-Open Utility-Model Publication No. S63(1988)-30662, Japanese Laid-Open Patent Publication No. H06(1994)-26565, etc.). However, this arrangement presents a new problem of the size of the transmission becoming large as it requires a space for the placement of a Pitot-flange.

In consideration of the above disadvantages, the applicant of the present invention has proposed a hydraulic controller disclosed in Japanese Laid-Open Patent Publication No. H11(1999)-257445. This hydraulic controller comprises an oil pump which is driven by the engine to deliver oil by the amount that corresponds to the rotational speed of the engine. The oil delivered from the oil pump is led into an oil passage with an orifice, and the above mentioned signal pressure for the engagement control is produced from the pressure difference created by the orifice, i.e., the difference in the pressure before and after the orifice in the flow.

As long as the temperature and viscosity of the oil does not change, the pressure difference created by the orifice changes in correspondence to the flow of the oil. This condition enables the production of the signal pressure that corresponds to the flow of the oil, i.e., to the rotational speed of the engine, which drives the oil pump. However, if the temperature of the oil changes, and the viscosity changes accordingly, then there is a change in the pressure difference even though the flow is kept constant. Because of this adverse effect, the signal pressure produced through the orifice when the oil is at a low temperature is higher than when the oil is at a high temperature. If the signal pressure is used in this condition, then the engagement control is not performed smoothly.

SUMMARY OF THE INVENTION

It is an object of the present invention to provide a hydraulic controller which utilizes a choking element formed in a separator plate.

It is another object of the present invention to provide a hydraulic controller whose construction enables formation of a choking element in a separator plate, for a passage provided in a valve body, which is provided on one side of the separator plate.

It is yet another object of the present invention to provide a hydraulic controller which always produces a signal pressure that corresponds to the rotation of the engine, from a pressure difference created through an orifice even though the temperature of the oil fluctuates.

A hydraulic controller according to the present invention is equipped with a first valve body, a second valve body and a separator plate, which is sandwiched between the first and second valve bodies. Also, the hydraulic controller comprises an upstream hydraulic control element (for example, the SC shift valve 92 described in the following preferred embodiment), a downstream hydraulic control element (for example, the SC backup valve 94 in the following embodiment), a connection oil passage (for example, oil passage 103 in the following embodiment) and a choking element (for example, the choke 75 in the following embodiment). The upstream hydraulic control element is provided on an upstream side for hydraulic control either in the first or second valve body, and the downstream hydraulic control element is provided on an downstream side for hydraulic control either in the first or second valve body. The connection oil passage connects the upstream hydraulic control element and the downstream hydraulic control element, and the choking element is placed in the connection oil passage. For this arrangement, the separator plate is provided with a slot-like opening (for example, the choke opening 75*a* in the following embodiment). In the assembled condition, where the separator plate is sandwiched between the first and second valve bodies, the part of the connection oil passage connecting to the upstream hydraulic control element is in fluid communication with one end of the slot-like opening while the part of the connection oil passage connecting to the downstream hydraulic control element is in fluid communication with the other end of the slot-like opening. As a result, a long narrow room created by the slot-like opening of the separator plate between the first and second valve bodies comprises the choking element.

In this hydraulic controller, oil flowing through the connection oil passage from the upstream hydraulic control element enters the slot-like opening at one end thereof and flows to the other end thereof and then flows through the connection oil passage connected thereto to the downstream hydraulic control element. In this case, the slot-like opening is a long narrow room created between the first and second valve bodies, so it provides a long choking route. In other words, the hydraulic controller according to the present invention comprises a choking element that is provided as a slot-like opening formed in the separator plate.

In this hydraulic controller, if the upstream and downstream hydraulic control elements are provided in the first valve body, and also the connection oil passage is formed in the first valve body, then preferably, the part of the connection oil passage connecting to the upstream hydraulic control element be formed in the first valve body, opening at a position which will meet one end of the slot-like opening. Preferably, the part of the connection oil passage connecting to the downstream hydraulic control element be also formed in the first valve body, opening at a position which will meet the other end of the slot-like opening.

With this arrangement, even if the first and second valve bodies and the connection oil passage are provided only in the first valve body, which is placed on one side of the separator plate, the slot-like opening formed in the separator plate can be still used as a choke which is provided in the connection oil passage.

According to another feature of the present invention, the hydraulic controller comprises a regulator valve, a group of control valves including at least a electrically controlled valve, and a discharge passage (for example, oil passage 102 in the following embodiment). The regulator valve generates a line pressure PL by adjusting the pressure of the oil delivered from an oil pump, which is driven by a prime mover. The group of control valves control the operation of a transmission by receiving the line pressure, and the discharge passage leads excess oil whose pressure is adjusted from the line pressure by the regulator valve. Furthermore, the discharge passage is bifurcated into a first branched discharge passage (for example, oil passage 102*a* and oil passage 105 in the following embodiment) and into a second branched discharge passage (for example, oil passage 103 in the following embodiment). The first branched discharge passage is provided with an on-off valve (for example, the SC shift valve 92 in the following embodiment), which closes the first branched discharge passage upon receiving a pressure generated in an event of failure of the electrically controlled valve. The second branched discharge passage is provided with a first orifice (for example, the first orifice 66 in the following embodiment). In addition, the hydraulic controller further comprises a signal pressure generating valve (for example, the SC backup valve 94 in the following embodiment), which generates a signal pressure in correspondence with the pressure difference existing through the first orifice of the second branched discharge passage. Furthermore, the second branched discharge passage is provided with a choke (for example, the choke 75 in the following embodiment), which is provided upstream to the first orifice.

In this arrangement, at least part of the above mentioned regulator valve, group of control valves and discharge passage is formed in a structure composed of the separator plate and the first and second valve bodies, which sandwich the separator plate, such that the above mentioned choke comprises the choking element (i.e., a long narrow room formed by the slot-like opening between the first and second valve bodies).

The hydraulic controller with this arrangement performs the engagement control of the starting clutch, etc. with a signal pressure generated in correspondence to the rotation of the engine by the electrically controlled valve in normal condition (i.e., while the electrically controlled valve operates normally with no electrical failure). In this condition, the on-off valve keeps the first branched discharge passage open, so the excess oil from the regulator valve is led through the first branched discharge passage and supplied as lubrication oil. Oil can be discharged though the second branched discharge passage, but the first orifice provided in the second branched discharge passage is a relatively large resistance to the flow. Therefore, oil is discharged mainly through the first branched discharge passage.

However, if there is an electrical failure, the electrically controlled valve cannot generate the signal pressure that corresponds to the rotation of the engine. In this case, the on-off valve closes the first branched discharge passage to lead the excess oil from the regulator valve to the second branched discharge passage. As a result, a pressure difference is created through the first orifice of the second branched discharge passage correspondingly to the flow, and then a signal pressure which corresponds to this pressure difference is generated by the signal pressure generating valve. Because this flow, i.e., the flow of the excess oil from the regulator valve, corresponds to the discharge of the oil pump, which is driven by the engine, this signal pressure is used, for example, for the engagement control of the starting clutch, as rotation-responding pressure that corresponds to the rotation of the engine.

In addition, to avoid a problem of fluctuations in the pressure difference through the first orifice caused by oil temperature changes which change the viscosity of the oil, the hydraulic controller according to the present invention has a choke, which is provided upstream to the first orifice on the second branched discharge passage. This choke functions to change the flow of oil through the first orifice when the temperature of the oil changes. In this way, the effect of the temperature change on the hydraulic controller is minimized to acquire the signal pressure that always corresponds to the rotation of the engine.

It is preferable that the second branched discharge passage be provided with a bypass passage (for example, oil passage 104a in the following embodiment) which connects a point upstream to the choke and a point downstream to the first orifice and that this bypass passage be provided with a second orifice (for example, the second orifice 67 in the following embodiment). Furthermore, preferably, the hydraulic controller be arranged to function in such a way that after the on-off valve has closed the first branched discharge passage by receiving a pressure generated because of a failure of the electrically controlled valve, when the pressure upstream to the choke of the second branched discharge passage increases to a predetermined pressure, the on-off valve is opened by this increased pressure upstream to the choke. With this arrangement, when the viscosity of the oil changes because of a change in the oil temperature, and because of this viscosity change, the pressure upstream to the choke changes. As a result, the flow through the bypass passage is changed. Also, by opening the on-off valve, the oil can be led to the first branched discharge passage. As a result, the effect of the oil temperature change on the pressure difference existing through the first orifice can be further minimized to keep the signal pressure generated from the signal pressure generating valve immune to the oil temperature fluctuation, so the signal pressure always corresponds to the rotational speed of the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention.

FIGS. 13A, 13B and 13C are sectional views showing the construction of chokes.

DESCRIPTION OF THE PREFERRED EMBODIMENTS

Figure 1:
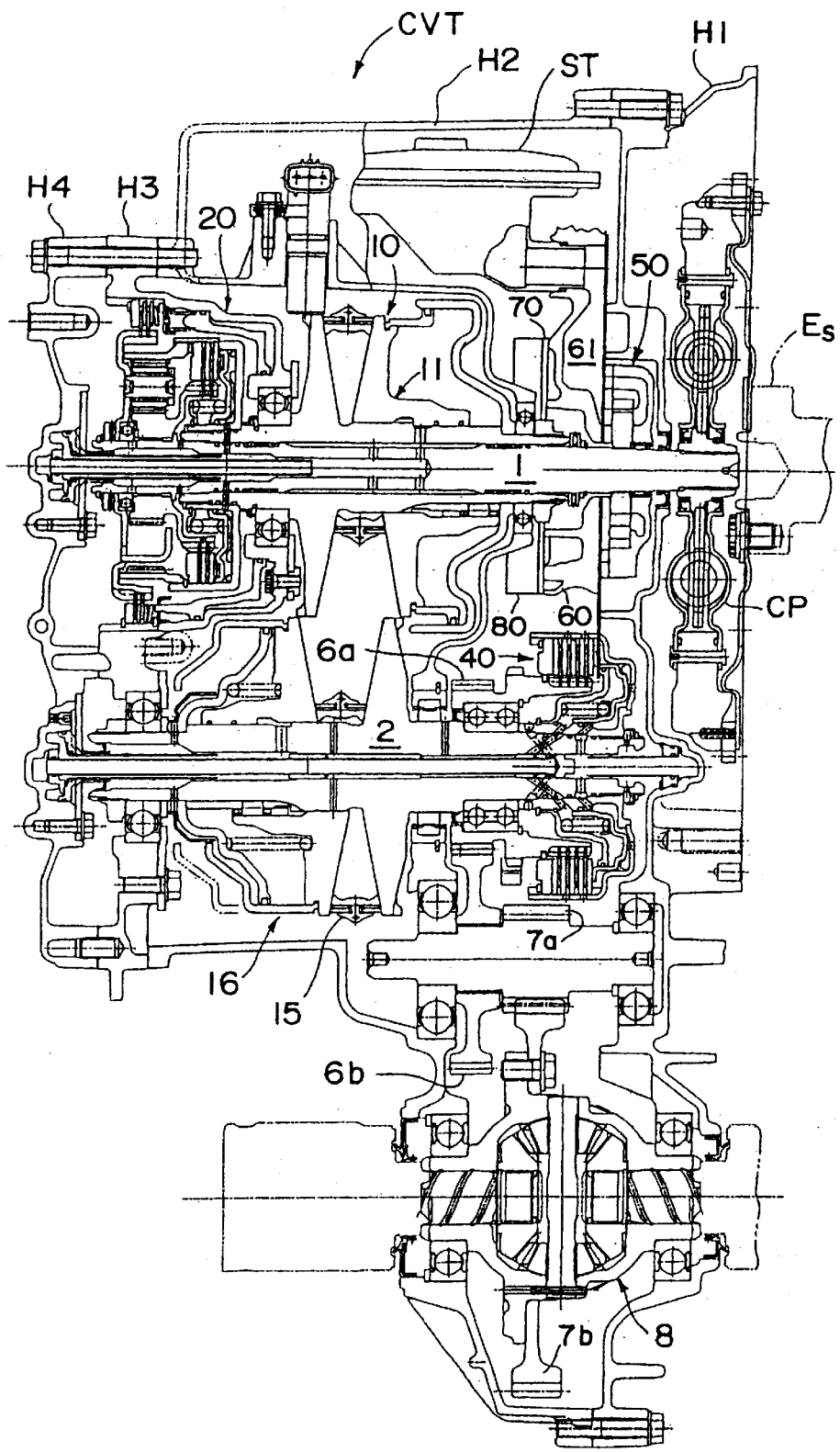
FIG. 1 is a sectional view of a belt-type continuously variable transmission, which comprises a hydraulic controller according to the present invention.
Figure 2:
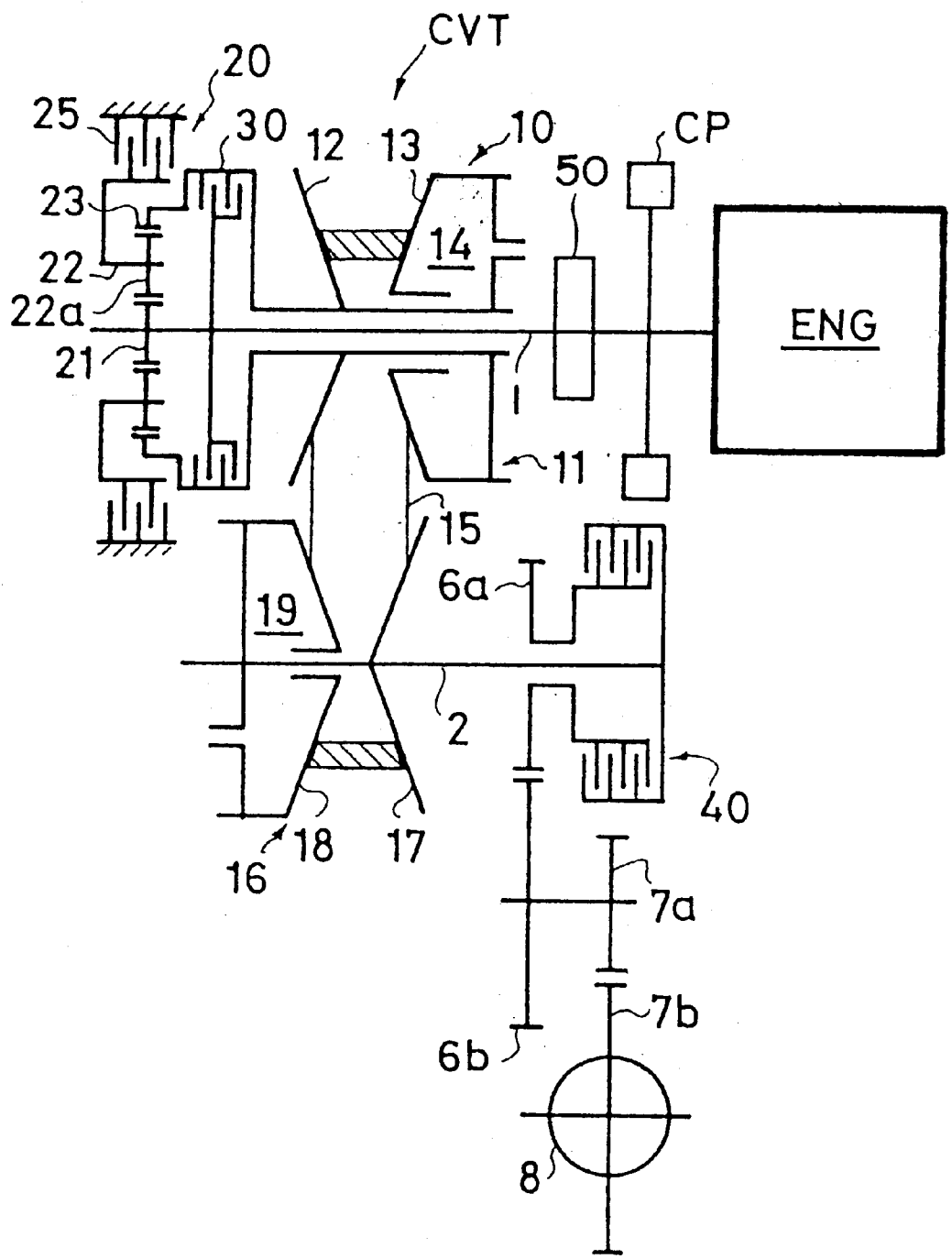
FIG. 2 is a schematic diagram showing the power transmission paths of the continuously variable transmission

Now, a preferred embodiment according to the present invention is described in reference to the drawings. FIGS. 1 and 2 show a belt-type continuously variable transmission CVT, which comprises a hydraulic controller according to the present invention. This belt-type continuously variable transmission CVT comprises an input shaft 1, a countershaft 2, a metal V-belt mechanism 10, a planetary gear type forward/reverse switching mechanism 20, a starting clutch mechanism 40, power transmission gear trains 6a, 6b, 7a and 7b, and a differential mechanism 8 in a transmission housing. The input shaft 1 of the transmission is connected through a coupling mechanism CP to the output shaft Es of the engine ENG. The metal V-belt mechanism 10 connects rotationally the input shaft 1 and the countershaft 2, which is provided parallel with the input shaft 1. The forward/ reverse switching mechanism 20 is disposed over the input shaft 1, and the starting clutch mechanism 40 is disposed on the countershaft 2. In addition, an oil pump 50 is provided on the input shaft 1 of the transmission.

The transmission housing comprises first, second, third and fourth housing units H1~H4, which are fixed to one another by means of bolts. The coupling mechanism CP is mounted in the first housing unit H1, and the starting clutch mechanism 40, the power transmission gear trains 6a, 6b, 7a and 7b, and the differential mechanism 8 are positioned in a room created by the first and second housing units H1 and H2. The metal V-belt mechanism 10 is positioned in a room created by the second and third housing units H2 and H3, and the forward/reverse switching mechanism 20 is positioned in a room created by the third and fourth housing units H3 and H4.

The metal V-belt mechanism 10 comprises a drive pulley 11, which is disposed over the input shaft 1, a driven pulley 16, which is disposed on the countershaft 2, and a metal V-belt 15, which is disposed around these pulleys 11 and 16. The drive pulley 11 comprises a stationary pulley half 12, which is disposed rotatably on the input shaft 1, and a movable pulley half 13, which rotates with stationary pulley half 12 and, at the same time, movable with respect to the stationary pulley half 12 in the axial direction of the pulley 11. The axial shift of the movable pulley half 13 is executed by the pressure supplied into a drive-pulley cylinder chamber 14 provided to the drive pulley 11. On the other hand, the driven pulley 16 comprises a stationary pulley half 17, which is fixed on the countershaft 2, and a movable pulley half 18, which rotates with the stationary pulley half 17 and movable with respect to the stationary pulley half 17 in the axial direction of the pulley. The axial shift of the movable pulley half 18 is executed by the pressure supplied into a driven-pulley cylinder chamber 19 provided to the driven pulley 16.

In this construction, the hydraulic pressures supplied into these cylinder chambers 14 and 19, respectively, are controlled to generate appropriate thrusts that act on the movable pulley halves 13 and 18 and vary appropriately the widths of the drive and driven pulleys 11 and 16. This pressure control enables the pitch radii of the respective pulleys 11 and 16 for the V belt 15 to change continuously, and thus the speed change ratio of the transmission is variable continuously.

The forward/reverse switching mechanism 20 is a planetary gear train, which comprises a sun gear 21, a carrier 22 and a ring gear 23. The sun gear 21 is connected to the input shaft 1, and the carrier 22 is rotatable coaxially with the sun gear 21 and retains rotatably a plurality of pinions 22a, which mesh with the sun gear 21. The ring gear 23 is also rotatable coaxially with the sun gear 21 and meshes with the pinions 22a. In addition, the forward/reverse switching mechanism 20 includes a reverse brake 25, which can hold the carrier 22 stationary, and a forward clutch 30, which engages and disengages the sun gear 21 to and from the ring gear 23. The reverse brake 25 and the forward clutch 30 are charged and discharged with actuation pressure for engagement and disengagement.

In this arrangement, when the forward clutch 30 is actuated for engagement while the reverse brake 25 is not engaged, the sun gear 21 and the ring gear 23 are connected to each other. In this condition, the sun gear 21, the carrier 22 and the ring gear 23 are all rotatable in unison with the input shaft 1, and the drive pulley 11 is rotatable in the same direction as the input shaft 1 (forward drive direction). On the other hand, when the forward clutch 30 is released and the reverse brake 25 is actuated for engagement, the carrier 22 is held stationary. In this condition, the ring gear 23 is rotatable in the direction opposite to that of the sun gear 21, so the drive pulley 11 is now also rotatable in the direction opposite to that of the input shaft 1 (reverse drive direction).

With this construction, the rotation of the input shaft 1 of the transmission is switched by the forward/reverse switching mechanism 20 and transmitted to the drive pulley 11 either in the forward drive or rearward drive direction. The speed of this rotation is varied continuously by the metal V-belt mechanism 10 and is transmitted to the countershaft 2. Then, the starting clutch 40, which is mounted on the countershaft 2, controls the transmission of power to the power transmission gear 6a. The rotational driving force transmitted through the starting clutch 40 to the power transmission gear 6a is then transmitted through the power transmission gear trains 6a, 6b, 7a and 7b, which includes the power transmission gear 6a, to the differential mechanism 8 and to the right and left drive wheels (not shown). With this arrangement, the rotational driving force transmitted to the wheels is controllable by controlling the engagement operation of the starting clutch 40, for example, in a startup control of the vehicle.

The engagement of the starting clutch 40 is controlled in correspondence to the rotation of the engine by the rotation-responding pressure Pr which corresponds to the rotational speed of the engine. The rotation-responding pressure Pr is produced by two different pressure generators, one generator being used in normal operation and the other to be used during electrical failures, which will be described in detail, later in this document.

In this continuously variable transmission, the reverse brake 25 and the forward clutch 30, which constitute the forward/reverse switching mechanism 20, are also charged and discharged hydraulically to switch the transmission between its forward and rearward drive modes, and the starting clutch 40 is also charged hydraulically to start the vehicle. Then, the drive- and driven-pulley cylinder chambers 14 and 19, which constitute the metal V-belt mechanism 10, are charged and discharged hydraulically to execute the continuous rotational speed change of the transmission. For these hydraulic operations, the hydraulic controller comprises an oil pump 50 to supply oil and a hydraulic control valve assembly used for controlling the charging and discharging of oil from the oil pump 50. This hydraulic control valve assembly comprises a first hydraulic control valve 60, a separator plate 70 and a second hydraulic control valve 80. In addition, the hydraulic control valve assembly is equipped with a third hydraulic control valve 85, which comprises an electrically controlled solenoid valve, described in detail later in this section.

Figure 3:
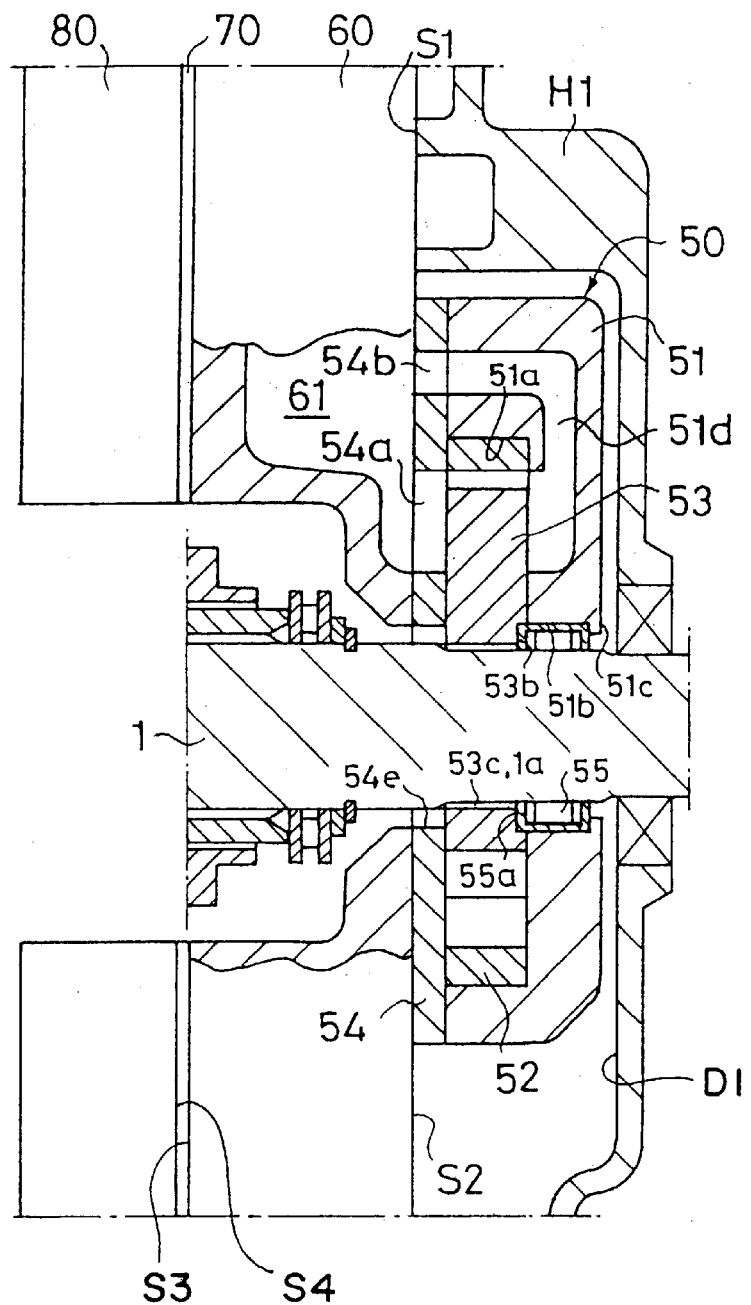
FIG. 3 is an enlarged partial sectional view showing a mount for an oil pump.
Figure 4:
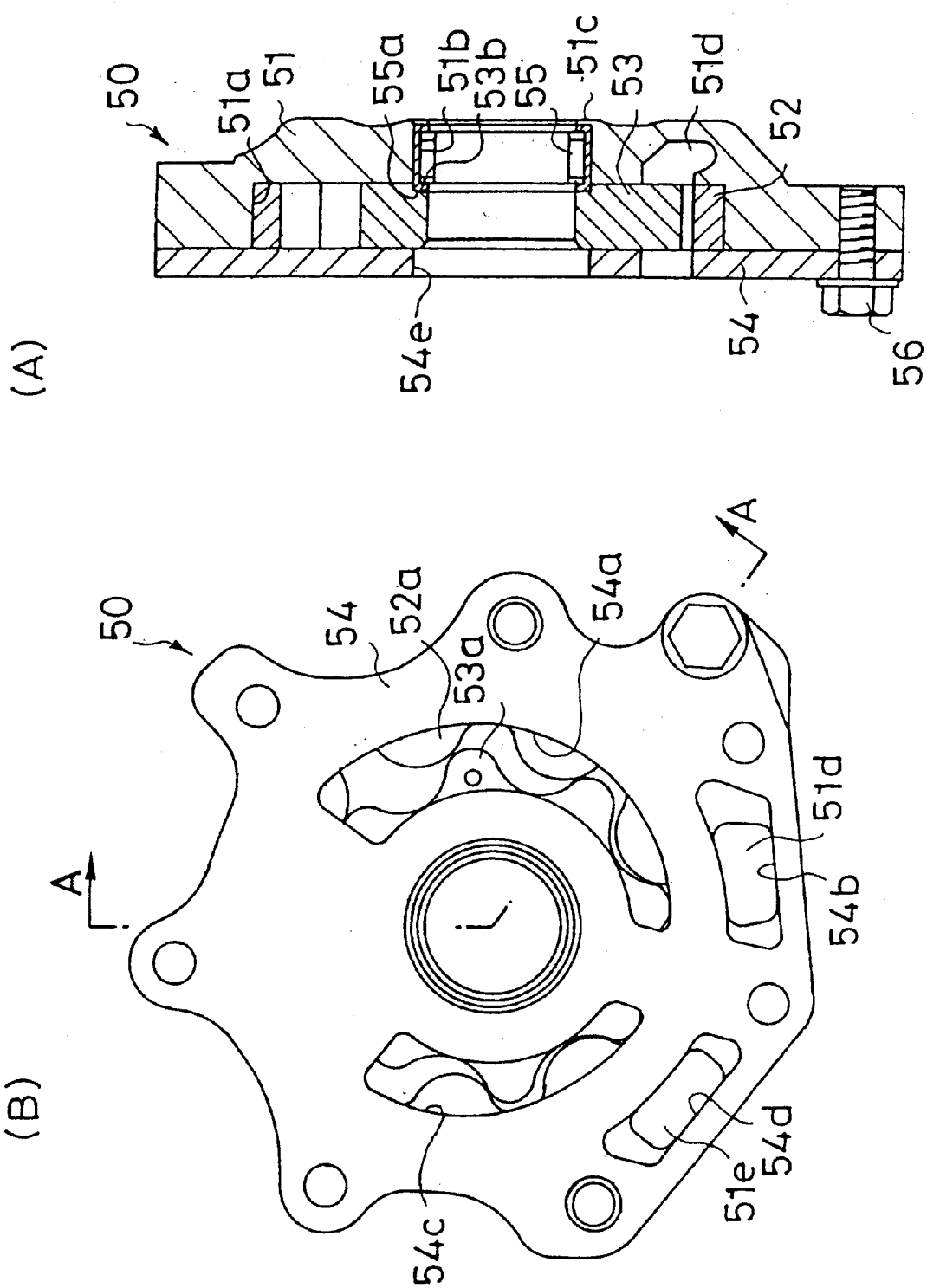
FIG. 4 is a side view and a sectional view of the oil pump only.
Figure 5:
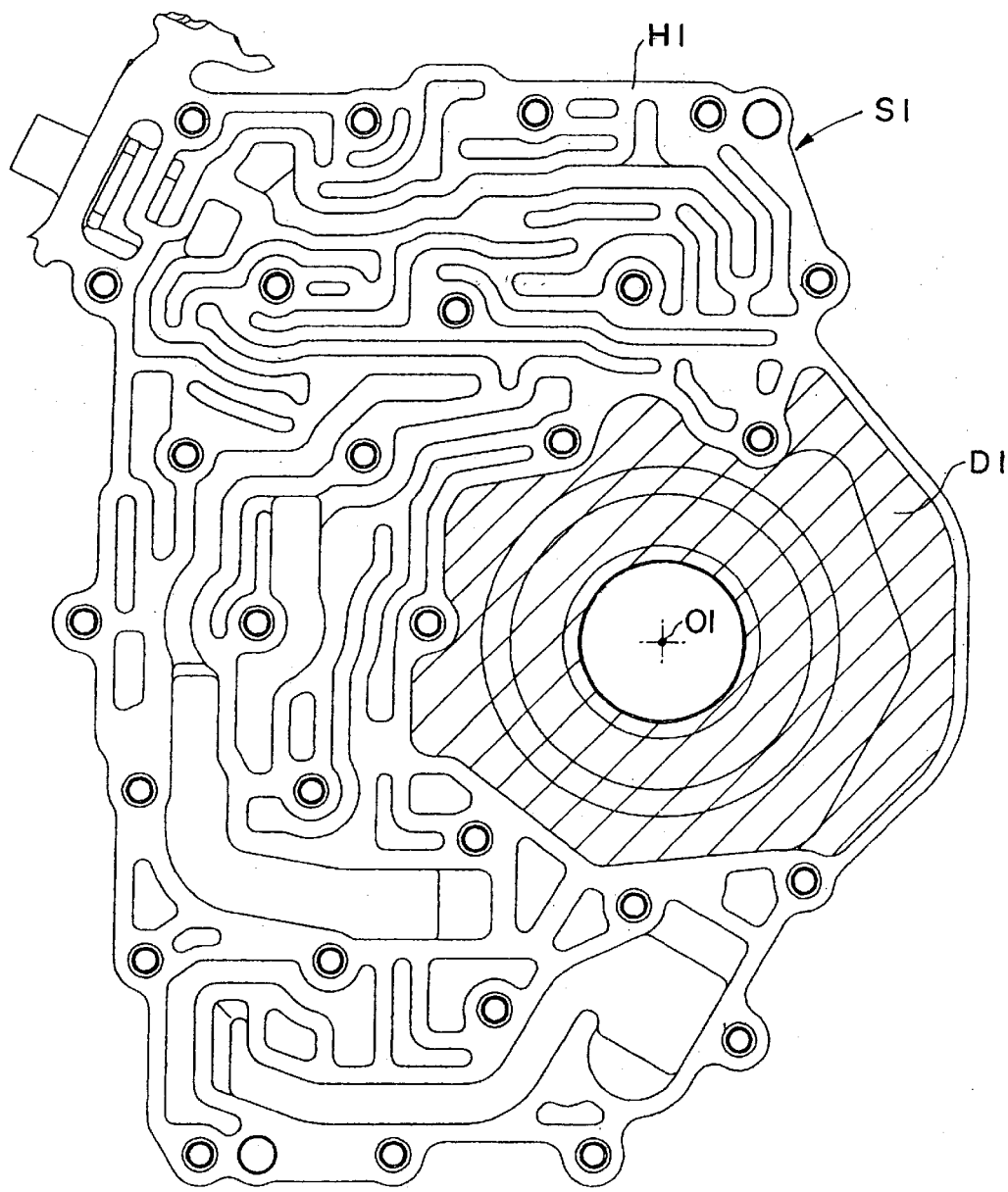
FIG. 5 is a view of an end face S1 of a first housing, on which face a first hydraulic control valve is placed and sealed.
Figure 6:
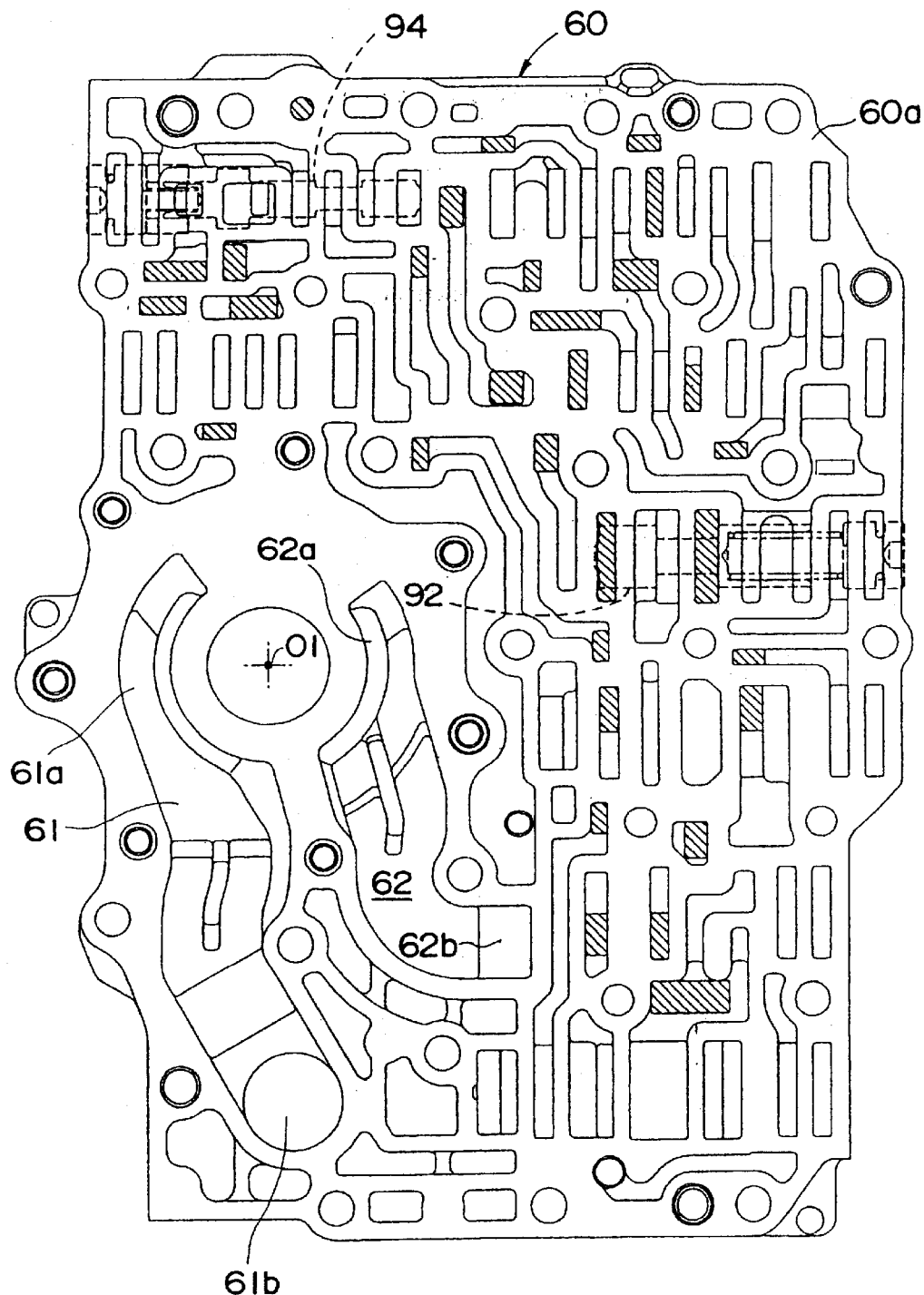
FIG. 6 is a side view showing an end face S2 of the first hydraulic control valve, which face is sealed onto the first housing.

The oil pump 50 is mounted on the input shaft 1 of the transmission as shown in FIG. 1, and this specific part is shown in enlargement in FIG. 3. In addition, FIG. 4 shows the construction of the oil pump 50 independently, in the condition prior to the mounting on the input shaft 1. The oil pump 50 is sealed onto the end face S2 (on the right side in FIG. 1 and FIG. 3) of the first hydraulic control valve 60, which is sealed onto the end face S1 (on the left side in FIG. 1 and FIG. 3) of the first housing unit H1 of the transmission housing. The end face S1 of the first housing unit H1 is shown in FIG. 5, and the end face S2 of the first hydraulic control valve 60 is shown in FIG. 6. As shown in FIG. 5, the first housing unit H1 has a plurality of grooves on the end face S1, which grooves are used as oil passages and function as part of the hydraulic control valve assembly. Therefore, this part of the first housing unit H1 carrying these grooves should be considered part of the valve body mentioned in the "WHAT IS CLAIMED IS:" section. In the drawings, the center of the input shaft 1 of the transmission is indicated with marking "O1".

Figure 7:
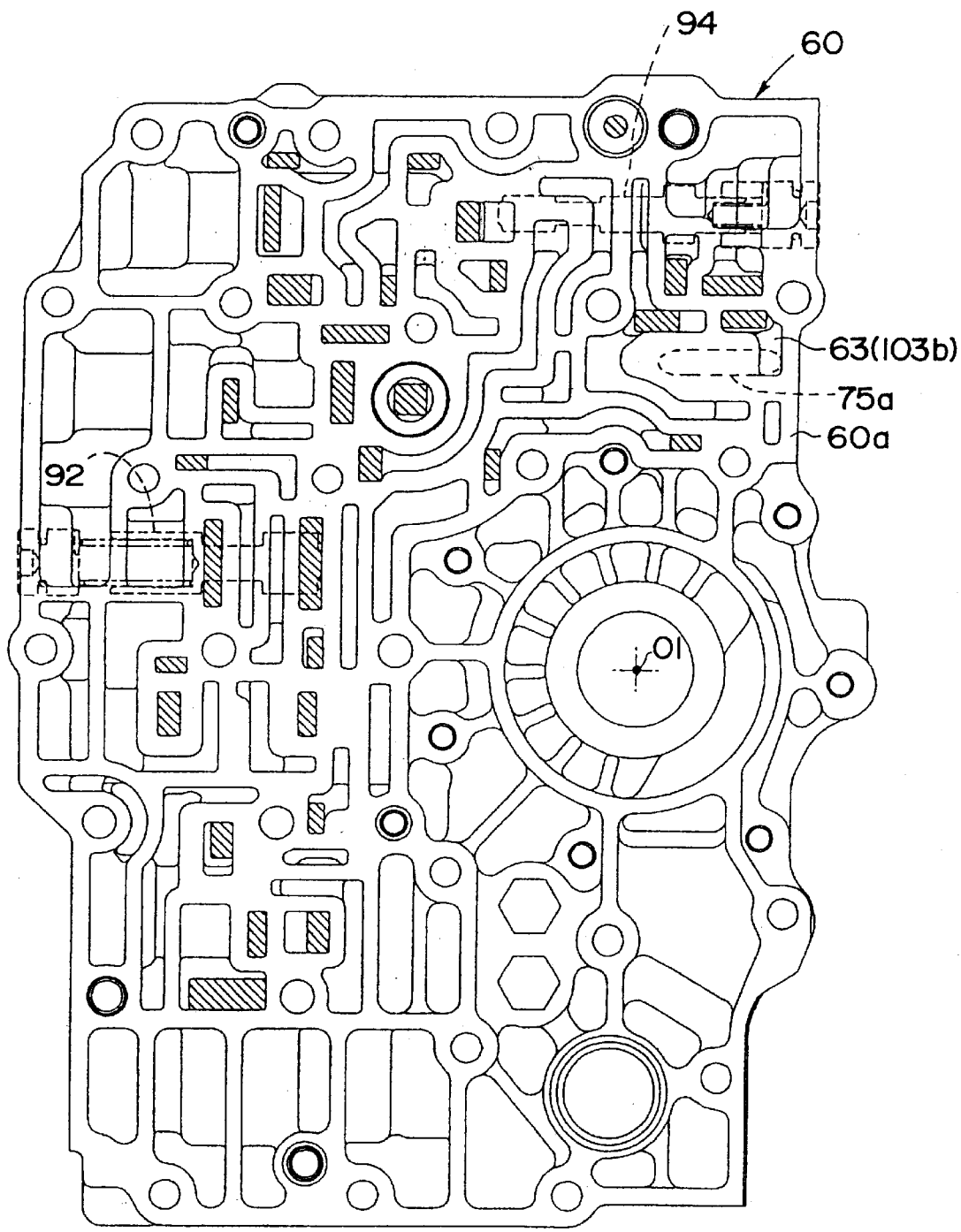
FIG. 7 is a side view showing an end face S3 of the first hydraulic control valve, which face is sealed onto a separator plate.
Figure 8:
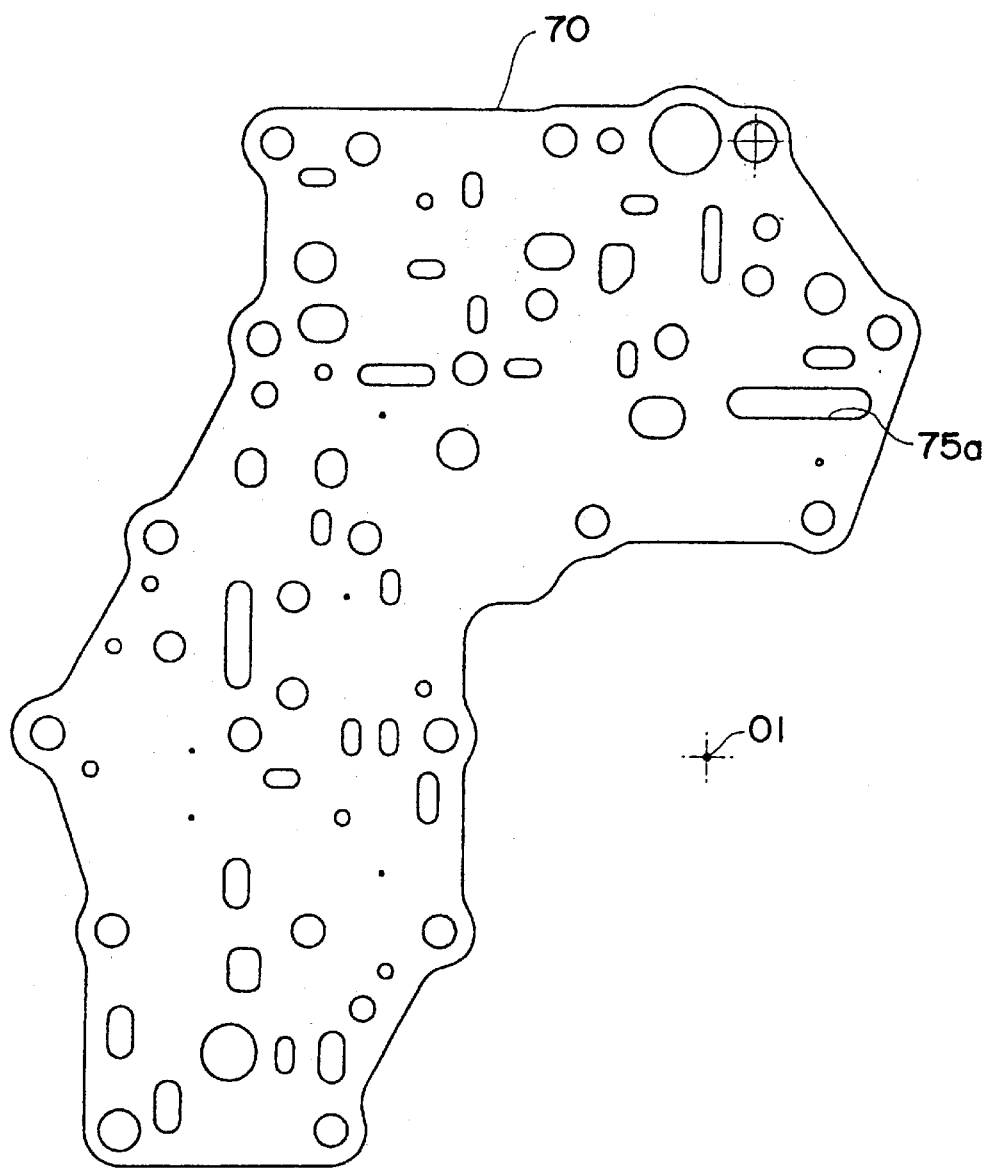
FIG. 8 is a side view of the separator plate.
Figure 9:
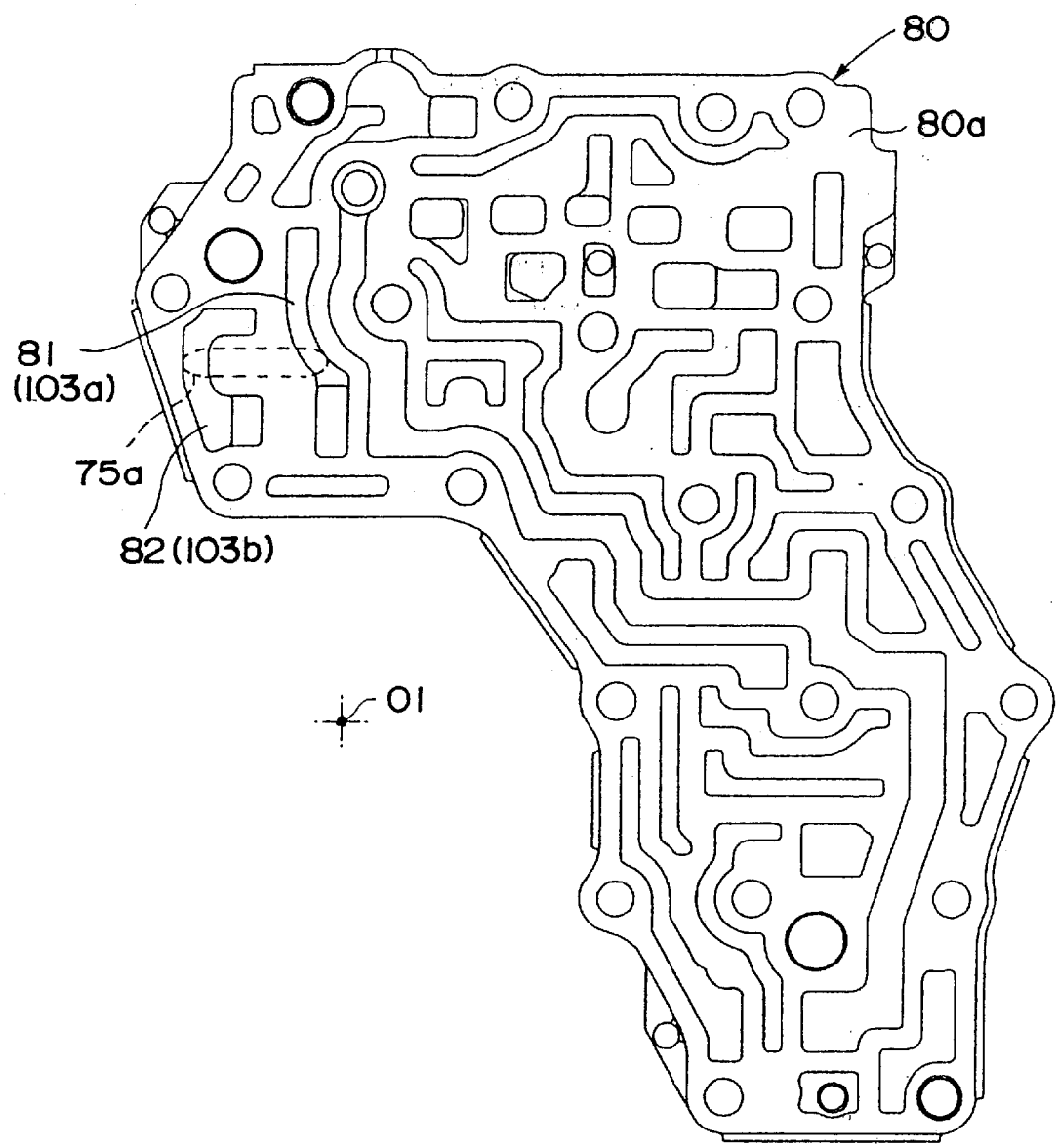
FIG. 9 is a side view of an end face S4 of a second hydraulic control valve, which face is sealed onto the separator plate.

As shown in the drawings, the separator plate 70 and the second hydraulic control valve 80 are mounted on the first hydraulic control valve 60. The left end face S3 of the first hydraulic control valve 60, on which the separator plate 70 is mounted, is shown in FIG. 7, and the separator plate 70 itself is shown in FIG. 8 while the right end face S4 of the second hydraulic control valve 80 is shown in FIG. 9. As mentioned previously, marking "O1" in these figures indicates the center of the input shaft 1. The first hydraulic control valve 60 comprises a valve body 60a, a plurality of valve spools placed in the valve body 60a, etc. The valve body 60a and these valve spools can be considered to constitute a plurality of hydraulic control valves (hydraulic control elements). On the other hand, the second hydraulic control valve 80 comprises only a valve body 80a with grooves which function as oil passages, so it has no valve spool.

In the condition where the oil pump 50 is sealed on the end face of the first hydraulic control valve 60, which is mounted on the end face S1 of the first housing unit H1, the oil pump 50 is positioned in the first housing unit H1 beyond the end face S1 (on the right side in FIG. 1 and FIG. 3), where a concave D1 is provided for the accommodation of the oil pump. The hatched area in FIG. 5 is where the pump-accommodating concave D1 is formed in the first housing unit H1. In this way, the oil pump 50 is positioned compactly in the transmission housing.

The oil pump 50 comprises a pump casing 51, an outer rotor 52, an inner rotor 53 and a pump cover 54. The pump casing 51 has a rotor-accommodating hollow 51a, where the outer rotor 52 is accommodated and received rotatably with its outer periphery. The outer rotor 52 is provided with internal trochoidal teeth 52a, and the inner rotor 53 is placed in the space surrounded by the internal trochoidal teeth 52a. The pump cover 54 is fixed on the pump casing 51 with bolts 56, covering the outer rotor 52 and the inner rotor 53 in the rotor-accommodating hollow 51a. Furthermore, an insertion bore 51b is formed axially through the pump casing 51, with a ring-like retainer 51c being provided coaxially with the insertion bore 51b at an end, and a bearing 55 is inserted and placed in the insertion bore 51b.

The bearing 55 is fixed at a predetermined position as it hits the ring-like retainer 51c. In this condition, the axially inward end 55a of the bearing 55 protrudes into the rotor-accommodating hollow 51a. To receive this protrusion, a ring-like fitting recess is provided at an end face of the inner rotor 53. As a result, in the condition where the oil pump 50 is independently assembled as shown in FIG. 4, the inner rotor 53 is supported by the periphery of the inward end 55a of the bearing 55 and thereby positioned coaxially to and rotatable with the bearing 55. On the other hand, the rotor-accommodating hollow 51a, which holds the outer rotor 52 rotatably, is positioned eccentric to the center of the bearing 55 by the pump casing 51. As a result, the internal trochoidal teeth 52a of the outer rotor 52 mesh eccentrically with the external trochoidal teeth 53a of the inner rotor 53.

As shown in FIG. 4B, the pump cover 54 is provided with suction ports 54a and 54b and delivery ports 54c and 54d. In addition, the pump casing 51 is provided with a suction room 51d, which is in fluid communication with the suction ports 54a and 54b, and a delivery room 51e, which is in fluid communication with the delivery ports 54c and 54d. These suction room 51d and delivery room 51e are to improve the efficiency of the suction and delivery of the oil pump 50 and are formed around the insertion bore 51b of the pump casing 51, where the bearing 55 is plated. This construction is to exploit the space occupied by the pump casing 51, whose thickness axially is relatively large because of its role for holding the bearing 55.

The pump cover 54 is provided with a through hole 54e coaxially with the bearing 55. For the mounting of the oil pump 50, the input shaft 1 of the transmission is inserted through the through hole 54e and into the bearing 55. As the inner rotor 53 of the oil pump 50 is centered and supported by the bearing 55 as described above, the mounting of the oil pump 50 on the input shaft 1 is carried out easily. As the pump casing 51 and the pump cover 54 are fixed on the end face S2 of the first hydraulic control valve 60 with bolts, the input shaft 1 is supported rotatably by the bearing 55. Because the input shaft 1 is provided with external splines 1a, which are formed to mesh with the internal splines 53c of the inner rotor 53 of the oil pump 50, the input shaft 1 and the inner rotor 53 are rotatable together as a one-piece body.

As shown in FIG. 6, the valve body 60a of the first hydraulic control valve 60 is provided with a suction passage 61 and a delivery passage 62, which meet with the suction ports 54a and 54b and the delivery ports 54c and 54d, respectively, in the condition where the pump casing 51 and the pump cover 54 are fixed on the end face S2 of the first hydraulic control valve 60. One end 61a of the suction passage 61 faces the suction ports 54a and 54b while the other end 61b is connected to a strainer ST (refer to FIG. 1). The strainer ST is positioned in an oil tank which is defined at the bottom of the transmission housing, and oil in the tank is sucked through the strainer ST into the suction passage 61. On the other hand, one end 62a of the delivery passage 62 faces the delivery ports 54c and 54d while the other end 62b is connected to another internal passage formed in the valve body 60a. Therefore, the oil delivered from the oil pump 50 is supplied through the delivery passage 62 into the valve body 60a.

In the belt-type continuously variable transmission CVT constructed as described above, when the input shaft 1 is driven by the engine ENG, the inner rotor 53 of the oil pump 50, which is rotated with the input shaft 1, rotates the outer rotor 52 eccentrically because the internal trochoidal teeth 52a of the outer rotor 52 are meshed with the external trochoidal teeth 53a of the inner rotor 53. As a result, oil is sucked through the strainer ST, the suction passage 61, the suction room 51d and the suction ports 54a and 54b and delivered through the delivery ports 54c and 54d, the delivery room 51e and the delivery passage 62 and supplied to the first hydraulic control valve 60. From the oil being supplied in this way, the first hydraulic control valve 60, the separator plate 70 and the second hydraulic control valve 80 generate control pressures that are necessary for operating the metal V-belt mechanism 10, the forward/reverse switching mechanism 20 and the starting clutch 40.

Figure 10:
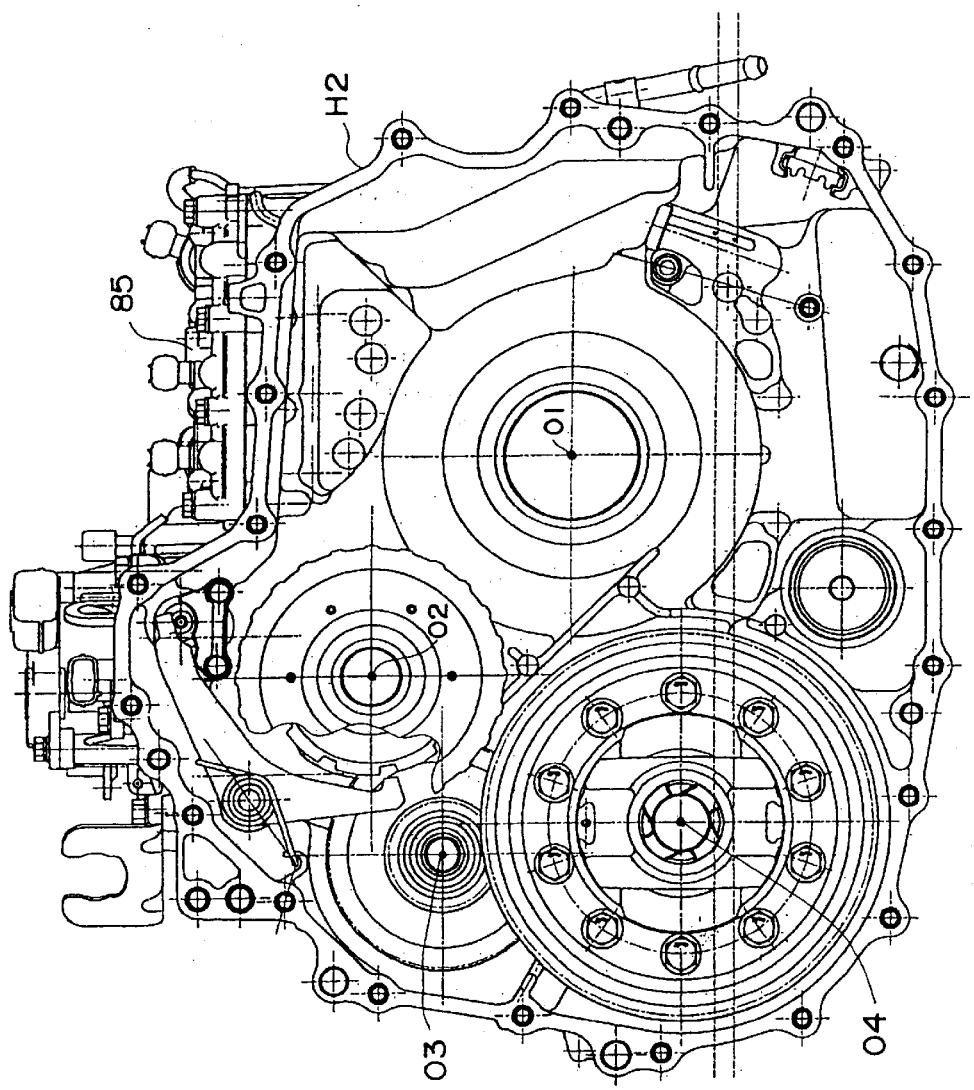
FIG. 10 is a side view of the continuously variable transmission without the first housing.

For this purpose, the belt-type continuously variable transmission CVT is equipped additionally with the third hydraulic control valve 85, which is positioned on the second housing unit H2 as shown in FIG. 10. The first hydraulic control valve 60, the second hydraulic control valve 80 and the third hydraulic control valve 85 are used together to generate the control pressures. For ease of maintenance, mainly electrically controlled parts such as solenoid valves and hydraulic control valves and their parts which may need operational inspection or replacement are provided as the third hydraulic control valve 85 on the outer surface of the transmission.

FIG. 10 shows the belt-type continuously variable transmission CVT without the first housing unit H1 and without the parts placed in the first housing unit H1, as a view in the direction from the engine. In the drawing, the center of the input shaft 1 is indicated with marking "O1", the center of the countershaft 2 is marked "O2", the center of the shaft on which the power transmission gears 6b and 7a are mounted is marked "O2", and the center of the differential mechanism 8 is marked "O4".

Figure 11:
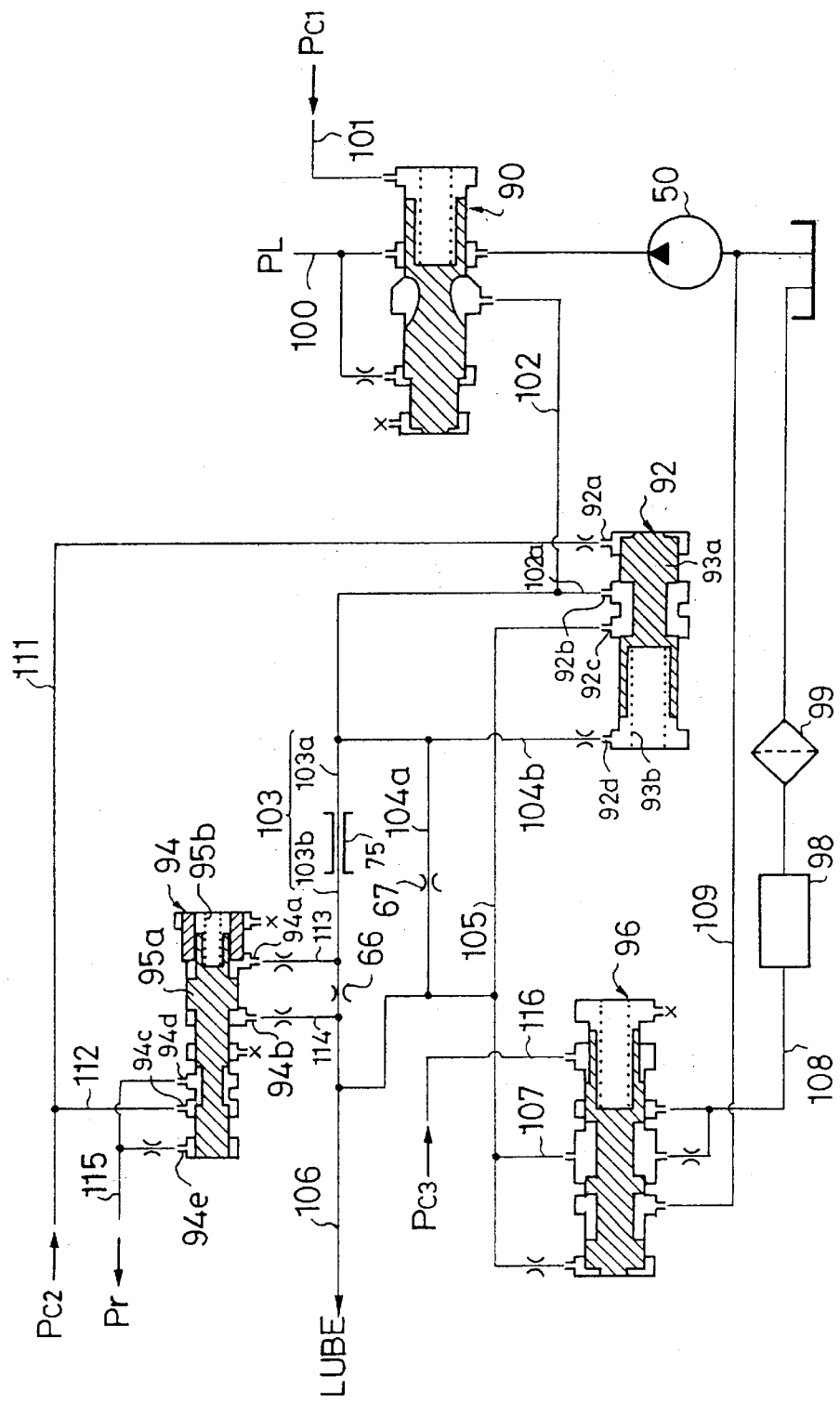
FIG. 11 is a hydraulic circuit diagram showing the internal components of the hydraulic controller.

As shown in FIG. 11, the oil pump 50 sucks oil from the oil tank OT at the bottom of the transmission housing and delivers to a regulator valve 90, which generates and regulates a line pressure PL. From this line pressure PL, the first hydraulic control valve 60, the second hydraulic control valve 80 and the third hydraulic control valve 85 produce the above mentioned pressures necessary for control operations. The regulator valve 90 receives a first control pressure Pc1 from line 101 and adjusts the line pressure PL in correspondence with the first control pressure Pc1. The line pressure PL, which is supplied through oil passage 100, is then utilized by valve elements (including an electrically controlled valve) for hydraulic control actuations. However, these valve elements are not described here.

On the other hand, as shown in FIG. 11, excess oil from the adjustment executed by the regulator valve 90 flows through oil passage 102, and it is used for production of the rotation-responding pressure Pr, or supplied as lubrication oil to the internal mechanisms of the transmission or returned to the oil tank OT. FIG. 11 shows hydraulic valve elements used for adjusting the rotation-responding pressure Pr and the lubrication pressure. The following is a description of these valve elements.

Oil passage 102, to which the excess oil is supplied from the regulator valve 90, is bifurcated into oil passage 102a, which is connected to a port 92b of an SC shift valve 92, and into oil passage 103, which comprises oil passage 103a located upstream to a choke 75 and oil passage 103b located downstream to the choke 75. The SC shift valve 92 comprises a spool 93a, which is slidable axially, and a spring 93b, which biases the spool 93a rightward. The SC shift valve 92 is also equipped with a port 92a at the right end, a port 92d at the left end and a port 92c at the middle thereof. Port 92a receives a second control pressure Pc2 through oil passage 111, and port 92d receives the pressure of oil passage 103a, and port 92c is connected to oil passage 105.

The second control pressure Pc2 is generated by an electrically controlled valve, which adjusts the second control pressure Pc2 to zero while it is receiving an electrical control signal in normal condition. However, when an electrical failure occurs, it sets the second control pressure Pc2 to a predetermined pressure. Therefore, while the transmission is in normal condition, the spool 93a of the SC shift valve 92 is biased by the spring 93b and maintained at the right end as shown in the drawing. In this condition, oil passage 102a is in fluid communication with oil passage 105 through ports 92b and 92c.

On the other hand, oil passage 103 is connected through the choke 75 and a first orifice 66 with oil passage 106 to lead oil to parts to be lubricated in the internal mechanisms of the transmission. In addition, the above mentioned oil passage 105 is also connected with this oil passage 106. Therefore, in the normal condition of the transmission, a little oil flows from oil passage 102 because the choke 75 and the first orifice 66 function as a resistance. As a result, most oil flows through oil passage 102 to the SC shift valve 92 and then through oil passage 105 to oil passage 106, where the oil is used for the lubrication of the internal mechanisms. Oil passage 105 is connected through oil passage 107 to a lubrication valve 96. The lubrication valve 96 adjusts the lubrication pressure in correspondence with a third control pressure Pc3, which is supplied through oil passage 116. Excess oil discharged from the lubrication valve 96 in the adjustment is returned through oil passage 108, an oil cooler 98 and a filter 99 to the oil tank OT and through oil passage 109 to the suction side of the oil pump 50.

Oil passage 103b is bifurcated before and after the first orifice 66 in the flow direction, respectively into oil passage 113 and oil passage 114, which are connected to a SC backup valve 94. The SC backup valve 94 comprises a spool 95a, which is slidable axially, and a spring 95b, which biases the spool 95a leftward. The SC backup valve 94 is also equipped with ports 94a and 94b, where oil passages 113 and 114 are connected. The SC backup valve 94 is equipped additionally with a port 94c connected to oil passage 112 through which the second control pressure Pc2 is supplied and with ports 94d and 94e connected to oil passage 115 for the output of the rotation-responding pressure Pr. The SC backup valve 94 is to generate and output the rotation-responding pressure Pr to oil passage 115 in correspondence with the pressure difference existing through the first orifice 66 when it is supplied with the second control pressure Pc2, which is set at a predetermined pressure during an event of electrical failure, through oil passage 112. While the transmission is in normal condition, as the second control pressure Pc2 is set to zero (Pc2=0), the SC backup valve 94 does not function to generate the rotation-responding pressure Pr (Pr=0).

As described previously, the rotation-responding pressure Pr, which corresponds to the rotational speed Ne of the engine ENG (or the rotational speed of the input shaft 1 of the transmission), is used for the engagement control of the starting clutch 40. In normal condition, the rotation-responding pressure Pr output to oil passage 115 is nil as described above, but the rotation-responding pressure Pr is generated in another way by a starting clutch control valve (not shown) which comprises an electrically controlled valve (for example, a linear solenoid valve). Therefore, the engagement of the starting clutch 40 is controlled by the rotation-responding pressure Pr generated by the starting clutch control valve in normal condition.

However, if there is an electrical failure (for example, the electrical supply to an electrically controlled valve is shut off during a system down), the starting clutch control valve, which comprises a linear solenoid valve, is not operable. In such a case, the rotation-responding pressure Pr is generated by the SC backup valve 94 for the engagement control of the starting clutch 40. The following is a description of the operation of the SC backup valve 94 during an electrical failure.

As mentioned above, when there is an electrical failure, the second control pressure Pc2 is set to a predetermined pressure, and the second control pressure Pc2 at the predetermined pressure is supplied through oil passage 111 to port 92a of the SC shift valve 92. As a result, the spool 93a of the SC shift valve 92 is shifted leftward closing port 92b. In this condition, the oil from oil passage 102 is led to oil passage 103 and then through the choke 75 and the first orifice 66 to oil passage 106.

Here, as the oil at the line pressure PL which is supplied through oil passage 100 from the regulator valve 90 is necessary only for control operations, the amount of the excess oil flowing through oil passage 102 at this moment almost equals that discharged from the oil pump 50. As the oil pump 50 is rotated by the input shaft 1 of the transmission as described previously, the flow through oil passage 102 corresponds to the rotational speed of the engine ENG. Therefore, the pressure difference existing through the first orifice 66 also corresponds to the rotational speed of the engine. The SC backup valve 94, which is actuated by this pressure difference applied through oil passages 113 and 114, adjusts the second control pressure Pc2, which is applied from oil passage 112, correspondingly with the pressure difference and outputs it as the rotation-responding pressure Pr to oil passage 115. Clearly, the rotation-responding pressure Pr from oil passage 115 corresponds to the rotational speed of the engine, so the engagement of the starting clutch 40 can be controlled in correspondence to the rotational speed of the engine with the rotation-responding pressure Pr during an event of failure.

However, the pressure difference through the first orifice 66 can change even though the flow is constant, if the temperature and thereby the viscosity of the oil changes. Without any measure taken to solve this problem, the pressure difference resulting at a low temperature may become so large and may make the rotation-responding pressure Pr too high to smoothly perform the engagement control of the starting clutch 40. To avoid this problem, oil passage 104b is branched from oil passage 103a at a point immediately upstream to the choke 75 to port 92d of the SC shift valve 92, and oil passage 104a with a second orifice 67 is provided as a bypass branching from oil passage 103a to oil passage 106.

The choke 75 has a long choking length in comparison to its choking cross-sectional area, so the resistance against the flow of oil provided by the choke 75 changes greatly as the viscosity of the oil changes. When the temperature of the oil flowing through oil passage 103 is low, the viscosity of the oil is high. In this condition, the resistance offered by the choke 75 is large, so part of the oil flowing through oil passage 103 is bypassed through oil passage 104a, which has the second orifice 67, to oil passage 106. Furthermore, the pressure of oil passage 103a upstream to the choke 75 increases, so the pressure which acts through oil passage 104b to port 92d of the SC shift valve 92 also increases. When this pressure becomes higher than a predetermined pressure, it shifts the spool 93a rightward. As a result, part of the oil is bypassed also through oil passage 102a to oil passage 105 to supply enough lubrication oil.

Figure 12:
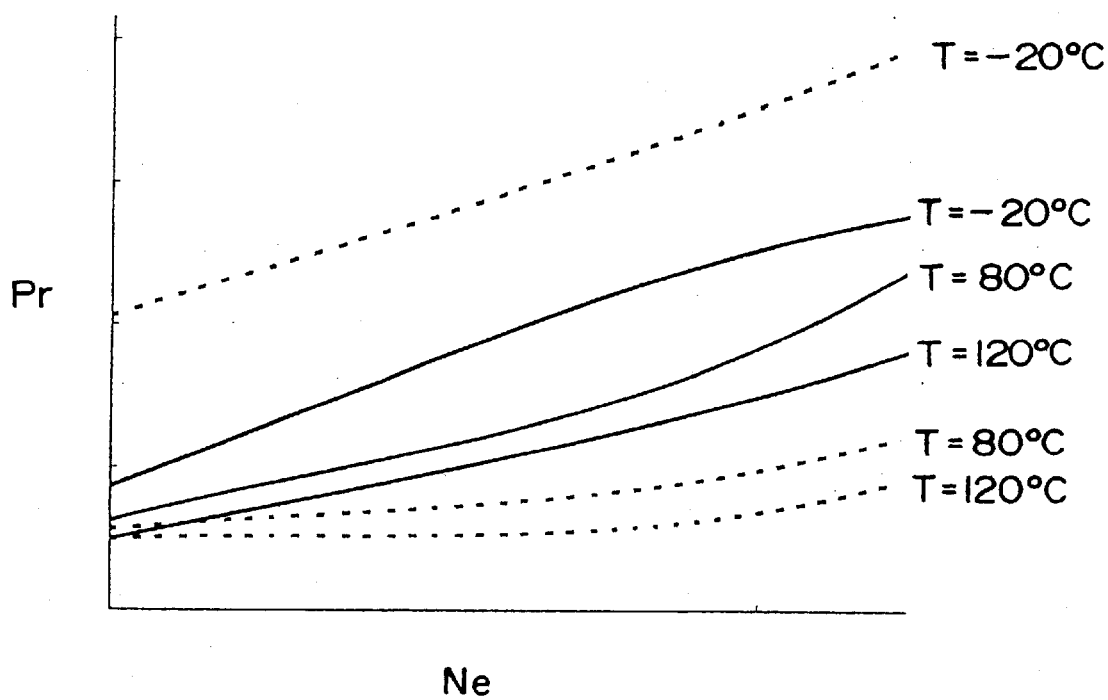
FIG. 12 is a graph showing relations between the pressure Pr which is generated by the hydraulic controller (referred to as "rotation-responding pressure") and the rotational speed of the engine.

In other words, when the temperature of the oil becomes lower, and the viscosity becomes higher, the flow of oil through the first orifice 66 decreases in correspondence to the increase of the viscosity. In this way, this arrangement acts to minimize the effect of the change of the oil temperature on the pressure difference through the first orifice 66, which difference is, therefore, always maintained to respond only to the rotational speed of the engine as shown in FIG. 12. As a result, the rotation-responding pressure Pr, which is output to oil passage 115, always corresponds to the rotation of the engine. FIG. 12 shows relations between the rotation-responding pressure Pr, which is represented along the axis of ordinate, and the rotational speed Ne of the engine, which is represented along the axis of abscissa. Real lines represent changes in the rotation-responding pressure Pr observed in oil passage 115 of the arrangement shown in FIG. 11 while broken lines represent changes in the rotation-responding pressure Pr observed in oil passage 115 without the choke 75 and oil passage 104a, for the temperature of the oil being at T=−20, 80 and 120 degrees centigrade, respectively. It is clear from the graph that the rotation-responding pressure Pr from oil passage 115 acquired with the arrangement shown in FIG. 11 is better suited for the engagement control of the starting clutch 40 even while the temperature of the oil is either high or low.

The following is a description of the construction of the valve assembly, which has the above described arrangement. The choke 75 is formed in the separator plate 70, which is sandwiched between the first hydraulic control valve 60 and the second hydraulic control valve 80, and the SC shift valve 92 and the SC backup valve 94 are placed in the valve body 60a of the first hydraulic control valve 60 as shown in broken lines in FIGS. 6 and 7.

As shown in FIG. 9, the valve body 80a of the second hydraulic control valve 80 is provided with an upstream passage groove 81 which constitutes oil passage 103a positioned upstream to the choke 75. Also, as shown in FIG. 7, the valve body 60a of the first hydraulic control valve 60 is provided with a passage groove 63 which constitutes oil passage 103b positioned downstream to the choke 75. Furthermore, as shown in FIG. 9, the valve body 80a of the second hydraulic control valve 80 is provided with another passage groove 82, and as shown in FIG. 8, the separator plate 70 is provided with a slot-like through hole, which functions as a choke opening 75a.

In the condition where the separator plate 70 is sandwiched between the first and second hydraulic control valves 60 and 80, the choke opening 75a is positioned as shown in broken lines in FIGS. 7 and 9. FIG. 13A is a sectional view of the choke opening 75a in this assembled condition. Passage groove 81 is connected to one end of the choke opening 75a while passage grooves 82 and 63 are connected to the other end of the choke opening 75a, with passage grooves 82 and 63 being positioned on the opposite sides of the separator plate 70. Therefore, oil flows from passage groove 81 through the choke opening 75a to passage grooves 63 and 82. Here, as the middle part of the choke opening 75a is enclosed by the valve bodies 60a and 80a, a narrow and long choking passage with a sectional area defined by the width of the choke opening 75a multiplied by the thickness of the separator plate 70 is formed for the choke 75. With this long choking length in comparison to its choking cross-sectional area, the choke 75 can change the resistance against the flow of oil greatly as the viscosity of the oil changes.

The choke 75 may be constructed as shown in FIG. 13B. In this case, the valve body 60a' of the first hydraulic control valve 60 is provided with an upstream passage groove 62' and a downstream passage groove 63', and this valve body is used with a valve body 80a' formed without any groove, to sandwich the separator plate 70. In this way, passage grooves can be provided only to the valve body 60a' of the first hydraulic control valve 60, yet the choke 75 is constructed by using the choke opening 75a of the separator plate 70. In a similar way, the choke 75 may be constructed by providing an upstream passage groove 62' to the valve body 60a" of the first hydraulic control valve 60 and a downstream passage groove 82' to the valve body 80a" of the second hydraulic control valve 80 as shown in FIG. 13C.

Figure 14:
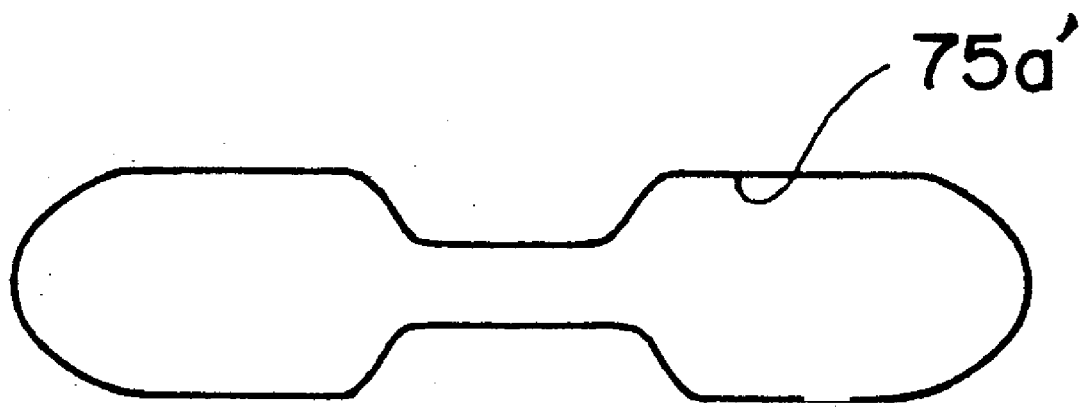
FIG. 14 is a side view showing the opening of a choke as an example of a different type, which is formed in the separator plate.

Furthermore, the choke opening may be formed in a figure as shown in FIG. 14, where the middle part of the choke opening 75a' is constricted and made narrower.

As described above, a hydraulic controller according to the present invention comprises an oil passage that discharges excess oil from the regulator valve, this oil passage being bifurcated into first and second branched discharge passages. The first branched discharge passage is provided with an on-off valve, which closes the first branched discharge passage when it receives the pressure that is generated in an event of failure of an electrically controlled valve. The second branched discharge passage is provided with a first orifice. The hydraulic controller further comprises a choke, which is provided on the second branched discharge passage upstream to the first orifice, and a signal pressure generating valve, which generates a signal pressure in correspondence to the pressure difference existing through the first orifice provided on the second branched discharge passage.

The hydraulic controller with this arrangement performs the engagement control of the starting clutch with a signal pressure which is generated in correspondence to the rotation of the engine by an electrically controlled valve in normal condition (i.e., while the electrically controlled valve operates normally with no electrical failure). In normal condition, the on-off valve opens the first branched discharge passage, so excess oil from the regulator valve is led through the first branched discharge passage and supplied as lubrication oil. However, if there is an electrical failure, the electrically controlled valve cannot generate the signal pressure that corresponds to the rotation of the engine, so the on-off valve closes the first branched discharge passage. In this condition, the excess oil from the regulator valve flows through the second branched discharge passage, so a pressure difference which corresponds to the flow is created through the first orifice on the second branched discharge passage. Then, a signal pressure which corresponds to the pressure difference is created by the signal pressure generating valve. Because this signal pressure corresponds to the flow of the excess oil from the regulator valve, which flow corresponds to the rotational speed of the engine, this signal pressure can be used, for example, for the engagement control of the starting clutch, as rotation-responding pressure which corresponds to the rotation of the engine.

In addition, to avoid a problem of fluctuations in the pressure difference existing through the first orifice caused by temperature changes which change the viscosity of the oil, the hydraulic controller according to the present invention further comprises a choke, which is positioned upstream to the first orifice on the second branched discharge passage. This choke functions to change the flow of oil through the first orifice when the temperature of the oil changes. In this way, the effect of the temperature change on the hydraulic controller is minimized to acquire signal pressure that always corresponds to the rotation of the engine.

It is preferable that the second branched discharge passage be provided with a bypass passage which connects a point upstream to the choke and a point downstream to the first orifice and that this bypass passage be provided with a second orifice whose temperature characteristic is different from that of the choke 75. Furthermore, preferably, the hydraulic controller be arranged to operate in such a way that after the on-off valve has closed the first branched discharge passage by receiving the pressure being generated because of the electrically controlled valve having failed to operate normally, when the pressure from a point upstream to the choke of the second branched discharge passage increases to a predetermined pressure, the on-off valve is opened. With this arrangement, when the viscosity of the oil changes because of a change in the oil temperature, the pressure upstream to the choke changes, so the flow through the bypass passage is changed. Also, by the opening of the on-off valve, the oil is led to the first branched discharge passage. As a result, the effect of the oil temperature change on the pressure difference existing through the first orifice can be even further minimized to keep the signal pressure generated from the signal pressure generating valve intact against the oil temperature fluctuation, so that the signal pressure always corresponds to the rotational speed of the engine.

According to another feature of the present invention, a choking element is provided as a long and narrow space that is defined by a slot-like opening provided in a separator plate, which is sandwiched by first and second valve bodies. Therefore, a hydraulic controller according to the present invention can comprise a slot-like opening formed in a separator plate. In this case, oil flowing through an oil passage from a hydraulic control element located upstream enters the slot-like opening at one end thereof and flows to the other end thereof and then flows through another oil passage connected thereto to a hydraulic control element located downstream. The slot-like opening provides a long choking route, which is formed as a long narrow space in the separator plate between the first and second valve bodies.

Moreover, in this hydraulic controller, it is preferable that the upstream hydraulic control element and the downstream hydraulic control element together with the respective oil passages be provided in the first valve body. In this case, preferably, the part of the oil passage connected to the upstream hydraulic control element be formed in the first valve body such that this part will face and open to one end of the slot-like opening formed in the separator plate. Likewise, preferably, the part of the oil passage connected to the downstream hydraulic control element be formed in the first valve body such that this part will face and open to the other end of the slot-like opening. With this arrangement, even though the upstream and downstream hydraulic control elements and the respective oil passages are all provided in the first valve body, which is placed on one side of the separator plate, the slot-like opening formed in the separator plate can still be used as a choke which is positioned between the respective oil passages.

In this case, the downstream hydraulic control element can be not only a hydraulic valve but also a hydraulic cylinder. Even, it may be an object to be lubricated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

RELATED APPLICATIONS

This application claims the priority of Japanese Patent Application No.2001-144366 filed on May 15, 2001 and Japanese Patent Application No.2001-144368 filed on May 15, 2001, which are incorporated herein by reference.

What is claimed is:

1. A hydraulic controller equipped with a first valve body, a second valve body and a separator plate which is sandwiched between said first and second valve bodies, said hydraulic controller comprising:

an upstream hydraulic control element, which is provided on an upstream side for hydraulic control either in said first or second valve body;

a downstream hydraulic control element, which is provided on a downstream side for hydraulic control either in said first or second valve body;

a connection oil passage, which connects said upstream hydraulic control element and said downstream hydraulic control element; and a choking element, which is placed in said connection oil passage;

wherein:

said separator plate is formed with a slot-like opening;

while said separator plate is sandwiched between said first and second valve bodies, part of said connection oil passage connecting to said upstream hydraulic control element is in fluid communication with one end of said slot-like opening, and part of said connection oil passage connecting to said downstream hydraulic control element is in fluid communication with another end of said slot-like opening; and a long narrow room created by said slot-like opening of said separator plate between said first and second valve bodies comprises said choking element.

2. The hydraulic controller as set forth in claim 1, wherein:

said upstream hydraulic control element and said downstream hydraulic control element are provided in said first valve body;

the part of said connection oil passage connecting to said upstream hydraulic control element is formed in said first valve body, opening at a position which will meet one end of said slot-like opening; and the part of said connection oil passage connecting to said downstream hydraulic control element is formed in said first valve body, opening at a position which will meet another end of said slot-like opening.

3. The hydraulic controller as set forth in claim 2, wherein:
said slot-like opening, which is formed as said choking element in said separator plate, has a figure in which middle part of said slot-like opening is constricted.

4. The hydraulic controller as set forth in claim 2, further comprising:
a regulator valve, which generates a line pressure by adjusting pressure of oil delivered from an oil pump being driven by a prime mover;
a group of control valves including at least an electrically controlled valve, which valves, by receiving said line pressure, control operation of a transmission; and
a discharge passage, which leads excess oil whose pressure is adjusted from said line pressure by said regulator valve;
wherein:
at least part of said regulator valve, said group of control valves and said discharge passage is formed in a structure composed of said separator plate and said first and second valve bodies, which sandwich said separator plate;
said discharge passage is bifurcated into a first branched discharge passage and a second branched discharge passage;
said first branched discharge passage is provided with an on-off valve, which closes said first branched discharge passage upon receiving a pressure generated in an event of failure of said electrically controlled valve;
said second branched discharge passage is provided with a first orifice;
said hydraulic controller further comprises a signal pressure generating valve, which generates a signal pressure in correspondence with a pressure difference existing through said first orifice;
said second branched discharge passage is provided with a choke, which is provided upstream to said first orifice; and
said choke comprises said choking element.

5. The hydraulic controller as set forth in claim 1, wherein:
said upstream hydraulic control element is provided in said first valve body while said downstream hydraulic control element is provided in said second valve body;
the part of said connection oil passage connecting to said upstream hydraulic control element is formed in said first valve body, opening at a position which will meet one end of said slot-like opening; and
the part of said connection oil passage connecting to said downstream hydraulic control element is formed in said second valve body, opening at a position which will meet another end of said slot-like opening.

6. The hydraulic controller as set forth in claim 5, wherein:
said slot-like opening, which is formed as said choking element in said separator plate, has a figure in which middle part of said slot-like opening is constricted.

7. The hydraulic controller as set forth in claim 5, further comprising:
a regulator valve, which generates a line pressure by adjusting pressure of oil delivered from an oil pump being driven by a prime mover;
a group of control valves including at least an electrically controlled valve, which valves, by receiving said line pressure, control operation of a transmission; and
a discharge passage, which leads excess oil whose pressure is adjusted from said line pressure by said regulator valve;
wherein:
at least part of said regulator valve, said group of control valves and said discharge passage is formed in a structure composed of said separator plate and said first and second valve bodies, which sandwich said separator plate;
said discharge passage is bifurcated into a first branched discharge passage and a second branched discharge passage;
said first branched discharge passage is provided with an on-off valve, which closes said first branched discharge passage upon receiving a pressure generated in an event of failure of said electrically controlled valve;
said second branched discharge passage is provided with a first orifice;
said hydraulic controller further comprises a signal pressure generating valve, which generates a signal pressure in correspondence with a pressure difference existing through said first orifice;
said second branched discharge passage is provided with a choke, which is provided upstream to said first orifice; and
said choke comprises said choking element.

8. The hydraulic controller as set forth in claim 1, wherein:
said slot-like opening, which is formed as said choking element in said separator plate, has a figure in which middle part of said slot-like opening is constricted.

9. The hydraulic controller as set forth in claim 8, further comprising:
a regulator valve, which generates a line pressure by adjusting pressure of oil delivered from an oil pump being driven by a prime mover;
a group of control valves including at least an electrically controlled valve, which valves, by receiving said line pressure, control operation of a transmission; and
a discharge passage, which leads excess oil whose pressure is adjusted from said line pressure by said regulator valve;
wherein:
at least part of said regulator valve, said group of control valves and said discharge passage is formed in a structure composed of said separator plate and said first and second valve bodies, which sandwich said separator plate;
said discharge passage is bifurcated into a first branched discharge passage and a second branched discharge passage;
said first branched discharge passage is provided with an on-off valve, which closes said first branched discharge passage upon receiving a pressure generated in an event of failure of said electrically controlled valve;
said second branched discharge passage is provided with a first orifice;
said hydraulic controller further comprises a signal pressure generating valve, which generates a signal pressure in correspondence with a pressure difference existing through said first orifice;

said second branched discharge passage is provided with a choke, which is provided upstream to said first orifice; and said choke comprises said choking element.

10. The hydraulic controller as set forth in claim 1, further comprising:

a regulator valve, which generates a line pressure by adjusting pressure of oil delivered from an oil pump being driven by a prime mover;

a group of control valves including at least an electrically controlled valve, which valves, by receiving said line pressure, control operation of a transmission; and a discharge passage, which leads excess oil whose pressure is adjusted from said line pressure by said regulator valve;

wherein:

at least part of said regulator valve, said group of control valves and said discharge passage is formed in a structure composed of said separator plate and said first and second valve bodies, which sandwich said separator plate;

said discharge passage is bifurcated into a first branched discharge passage and a second branched discharge passage;

said first branched discharge passage is provided with an on-off valve, which closes said first branched discharge passage upon receiving a pressure generated in an event of failure of said electrically controlled valve;

said second branched discharge passage is provided with a first orifice;

said hydraulic controller further comprises a signal pressure generating valve, which generates a signal pressure in correspondence with a pressure difference existing through said first orifice;

said second branched discharge passage is provided with a choke, which is provided upstream to said first orifice; and said choke comprises said choking element.

11. The hydraulic controller as set forth in claim 10, wherein:

said second branched discharge passage is provided with a bypass passage, which connects a point upstream to said choke and a point downstream to said first orifice; and said bypass passage is provided with a second orifice.

12. The hydraulic controller as set forth in claim 11, wherein:

after said on-off valve has closed said first branched discharge passage by a pressure generated because of a failure of said electrically controlled valve, when the pressure upstream to said choke of said second branched discharge passage increases to a predetermined pressure, said on-off valve is opened by the pressure upstream to said choke.

13. The hydraulic controller as set forth in claim 10 wherein:

after said on-off valve has closed said first branched discharge passage by a pressure generated because of a failure of said electrically controlled valve, when the pressure upstream to said choke of said second branched discharge passage increases to a predetermined pressure, said on-off valve is opened by the pressure upstream to said choke.

* * * * *